US009221313B2

(12) United States Patent
Heitlinger et al.

(10) Patent No.: US 9,221,313 B2
(45) Date of Patent: Dec. 29, 2015

(54) STABILIZER FOR A LOWER LINK OF A THREE-POINT HITCH OF A TRACTOR

(75) Inventors: Martin Heitlinger, Östringen (DE); Hans Sauermann, Ernsgaden (DE)

(73) Assignees: DEERE & COMPANY, Moline, IL (US); HSM HANS SAUERMANN GMBH & CO. KG, Ernsgaden (DE)

( * ) Notice: Subject to any disclaimer, the term of this patent is extended or adjusted under 35 U.S.C. 154(b) by 0 days.

(21) Appl. No.: 14/239,317

(22) PCT Filed: Jul. 25, 2012

(86) PCT No.: PCT/EP2012/064588
§ 371 (c)(1),
(2), (4) Date: Feb. 18, 2014

(87) PCT Pub. No.: WO2013/026646
PCT Pub. Date: Feb. 28, 2013

(65) Prior Publication Data
US 2014/0210183 A1 Jul. 31, 2014

(30) Foreign Application Priority Data
Aug. 19, 2011 (DE) .......................... 10 2011 081 274

(51) Int. Cl.
*A01B 59/041* (2006.01)
*B60D 1/24* (2006.01)
(52) U.S. Cl.
CPC .............. *B60D 1/249* (2013.01); *A01B 59/041* (2013.01)
(58) Field of Classification Search
USPC ......................................... 172/439, 450, 443
IPC ..................................................... A01B 59/041
See application file for complete search history.

(56) References Cited

U.S. PATENT DOCUMENTS 3,825,283 A * 7/1974 Hansen .......................... 172/439
4,194,757 A * 3/1980 Lucas et al. .................... 172/439
(Continued)

FOREIGN PATENT DOCUMENTS

EP  1342399 A1  9/2003
EP  1905289 A1  4/2008
(Continued)

OTHER PUBLICATIONS

International Search Report and Written Opinion for International Application No. PCT/EP2012/064588 mailed Oct. 29, 2012 (11 pages).

*Primary Examiner* — Gary Hartmann
(74) *Attorney, Agent, or Firm* — Kilpatrick Townsend & Stockton LLP

(57) ABSTRACT

Stabilizer for a lower link of a three-point hitch of a tractor, comprising a first stabilizer member and a second stabilizer member connected to the first stabilizer member by a spring mechanism which allows a longitudinal movement between the stabilizer members, wherein the overall length of the stabilizer is adjustable by rotating the stabilizer members against each other. Furthermore, a blocking means is connected to the first stabilizer member, wherein the blocking means can be moved into a closed position in which a longitudinal movement between the stabilizer members is restricted. The first stabilizer member comprises a rotation-symmetric locking collar which engages the blocking means in the closed position such in that a longitudinal movement between the stabilizer members is disabled, wherein a rotation between the stabilizer members is lockable by a safety means, wherein the safety means comprises a spring clip engaging a recess formed in the circumference of the locking collar.

18 Claims, 3 Drawing Sheets

(56) References Cited

U.S. PATENT DOCUMENTS

| | | | | |
|---|---|---|---|---|
| 5,361,850 A | * | 11/1994 | Muller et al. | 172/450 |
| 6,386,571 B1 | * | 5/2002 | Vollmer et al. | 280/455.1 |
| 7,048,071 B1 | * | 5/2006 | Huenink et al. | 172/439 |
| 8,851,199 B2 | * | 10/2014 | Sauermann | 172/450 |
| 2012/0153552 A1 | * | 6/2012 | Sauermann | 267/140.13 |
| 2015/0047864 A1 | * | 2/2015 | Heitlinger et al. | 172/450 |

FOREIGN PATENT DOCUMENTS

| | | | |
|---|---|---|---|
| EP | 2 232 973 | * | 3/2010 |
| EP | 2 324 692 | * | 5/2011 |

* cited by examiner

STABILIZER FOR A LOWER LINK OF A THREE-POINT HITCH OF A TRACTOR

BACKGROUND

A stabilizer for a lower link of a three-point hitch of a tractor is known, for example, from DE 602 00 422 T2. The stabilizer fitted in an articulated manner between the tractor and lower link comprises a first stabilizer member and a second stabilizer member which is arranged so as to be resiliently movable with respect to the first stabilizer member. A locking means which is pivotably articulated to the first stabilizer member and which is in the form of a locking flap serves to mutually lock the two stabilizer members, for which a recess which is provided in the locking means can be brought into engagement with a nose-like projection which is formed on the second stabilizer member in such a manner that a resilient movement which occurs between the stabilizer members is prevented. In addition, the two stabilizer members can be rotated with respect to each other in order to enable manual adjustment of the total length of the stabilizer. A curved resilient member which is pivotably arranged on the second stabilizer member engages in a relaxed rest position around a projection which protrudes on the first stabilizer member in such a manner that a rotation of the two stabilizer members and consequently unintentional adjustment of the total length can be secured.

As a result of the limited arrangement possibilities of the projection on the second stabilizer member resulting from the presence of the locking flap, securing of the stabilizer is limited from the outset to a few positions between the first and second stabilizer member.

An object of the present invention is therefore to provide a stabilizer which is improved with respect to the adjustability thereof for a lower link of a three-point hitch of a tractor.

SUMMARY

The stabilizer according to the invention for a lower link of a three-point hitch of a tractor comprises a first stabilizer member and a second stabilizer member which is resiliently supported with respect to the first stabilizer member along a common longitudinal axis, wherein the two stabilizer members are able to be rotated relative to each other in order to adjust the total length of the stabilizer in relation to the common longitudinal axis. Furthermore, there is provided a locking means which is connected to the first stabilizer member and which can be moved into a predetermined locking position in order to limit a resilient movement which occurs between the two stabilizer members. The first stabilizer member has a locking collar which is constructed in a rotationally symmetrical manner with respect to the common longitudinal axis and which, when the locking means is located in the predetermined locking position, engages in a recess which is arranged in the locking means in such a manner that a deflection and rebound movement which occurs between the two stabilizer members is prevented. In order to prevent unintentional adjustment of the total length of the stabilizer, the second stabilizer member can be secured with respect to the first stabilizer member by way of a securing means, wherein the securing means comprises a curved resilient member which engages or is pressed in a recess which is provided in the periphery of the locking collar. The curved resilient member can be pivoted manually out of the recess counter to a restoring resilient force so that the locking collar is released.

More precisely, the locking collar is in the form of a protuberance which extends along the outer side of the second stabilizer member in an annular manner. As a result of the rotational symmetry of the locking collar, the recess can be provided at any desired location along the protuberance. In particular it is possible to arrange a large number of such recesses in a uniform manner beside each other so that the stabilizer can be twisted and subsequently secured in a sensitive manner when the mounted device is fitted.

Preferably, the locking means is constructed as a locking flap, wherein the locking flap is pivotably connected to the first stabilizer member by means of a hinge pin which extends transversely relative to the common longitudinal axis of the stabilizer. The locking flap can be connected via a tensile flap by means of a helical spring or the like to a corresponding securing location on the tractor in such a manner that it is automatically pivoted into the predetermined locking position when the lower links are lifted.

The locking flap may at least partially surround the first stabilizer member in the predetermined locking position so that additional protection from contamination is provided. The locking flap which is produced as a cast or forged component is in particular in the form of a half-shell which at least partially surrounds or encloses the first stabilizer member. The half-shell terminates at one end in two opposing hinge flaps, by means of which a pivotable connection to the first stabilizer member can be produced. At the other end, there are provided two opposing walls, each of which has a separate recess for the engagement of the locking collar, wherein the two walls are formed on the inner side thereof in such a manner that they at least partially abut the second stabilizer member in the region of the locking collar.

In order to produce a tractor-side articulated connection, the first stabilizer member may comprise a spherical lug. The spherical lug comprises a securing eyelet which is formed in a securing region of the first stabilizer member and a securing ball which is rotatably supported therein and which enables a spatial movement of the stabilizer with respect to the tractor.

Furthermore, the second stabilizer member may comprise a securing member for producing an articulated connection with respect to a lower link of a three-point hitch. The securing member has a securing fork which can be fitted to the lower link, wherein the articulated connection which can be produced with the lower link by means of the securing fork is articulated with respect to the tractor-side articulated connection in such a perpendicular manner that the stabilizer can follow both horizontal and vertical redirections of the lower link.

Preferably, an inner thread which is formed inside the second stabilizer member engages on an outer thread formed on the securing member in such a manner that the stabilizer can be adjusted in terms of the total length thereof by means of rotation of the second stabilizer member with respect to the first stabilizer member. In this manner, the position of the lower link can be adapted in a flexible manner to the dimensions of different mounted device interfaces.

In this instance, it is possible, in order to rotatably actuate the second stabilizer member, for a tool receiving member to be provided. The tool receiving member may have a large number of flattened portions which are provided in order to receive a combination wrench so that, by inverting the combination wrench even under limited spatial conditions, ready rotational actuation of the second stabilizer member is possible.

In order to facilitate manual actuation of the curved resilient member, it has at the free end thereof a gripping region which widens in the manner of an eyelet. The restoring resilient force is dimensioned in such a manner that, on the one hand, reliable securing of the second stabilizer member is ensured and, on the other hand, tool-free actuation of the curved resilient member remains possible. The curved resilient member is, for example, produced from a rust-resistant round wire which has been surface-treated in an appropriate manner.

The recess is in particular in the form of a slot-like recess, which is orientated in the direction of a resilient movement which occurs between the first stabilizer member and the second stabilizer member. The slot-like recess is constructed in such a manner that it completely receives a securing segment which is provided on the curved resilient member. Since the curved resilient member is capable of sliding along the slot-like recess, a resilient movement which occurs between the two stabilizer members is not impeded.

BRIEF DESCRIPTION OF THE DRAWINGS

The stabilizer according to the invention is explained in greater detail below with reference to the appended drawings. In this instance, components which correspond or which are comparable in terms of their function are given the same reference numerals. In the drawings.

DETAILED DESCRIPTION

Figure 1:
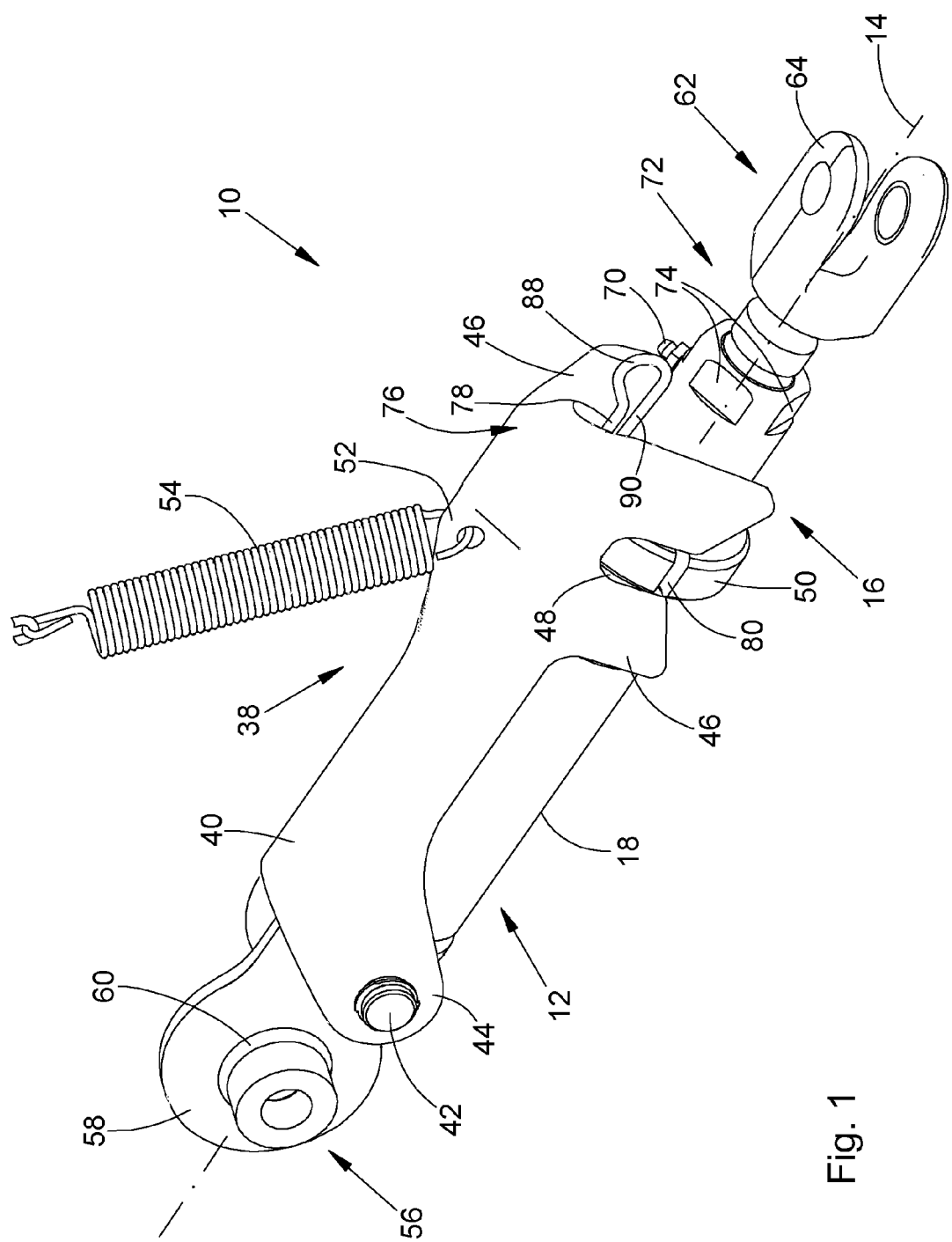
FIG. 1 is a perspective view of an embodiment of the stabilizer according to the invention for a lower link of a three-point hitch of a tractor.
Figure 2:
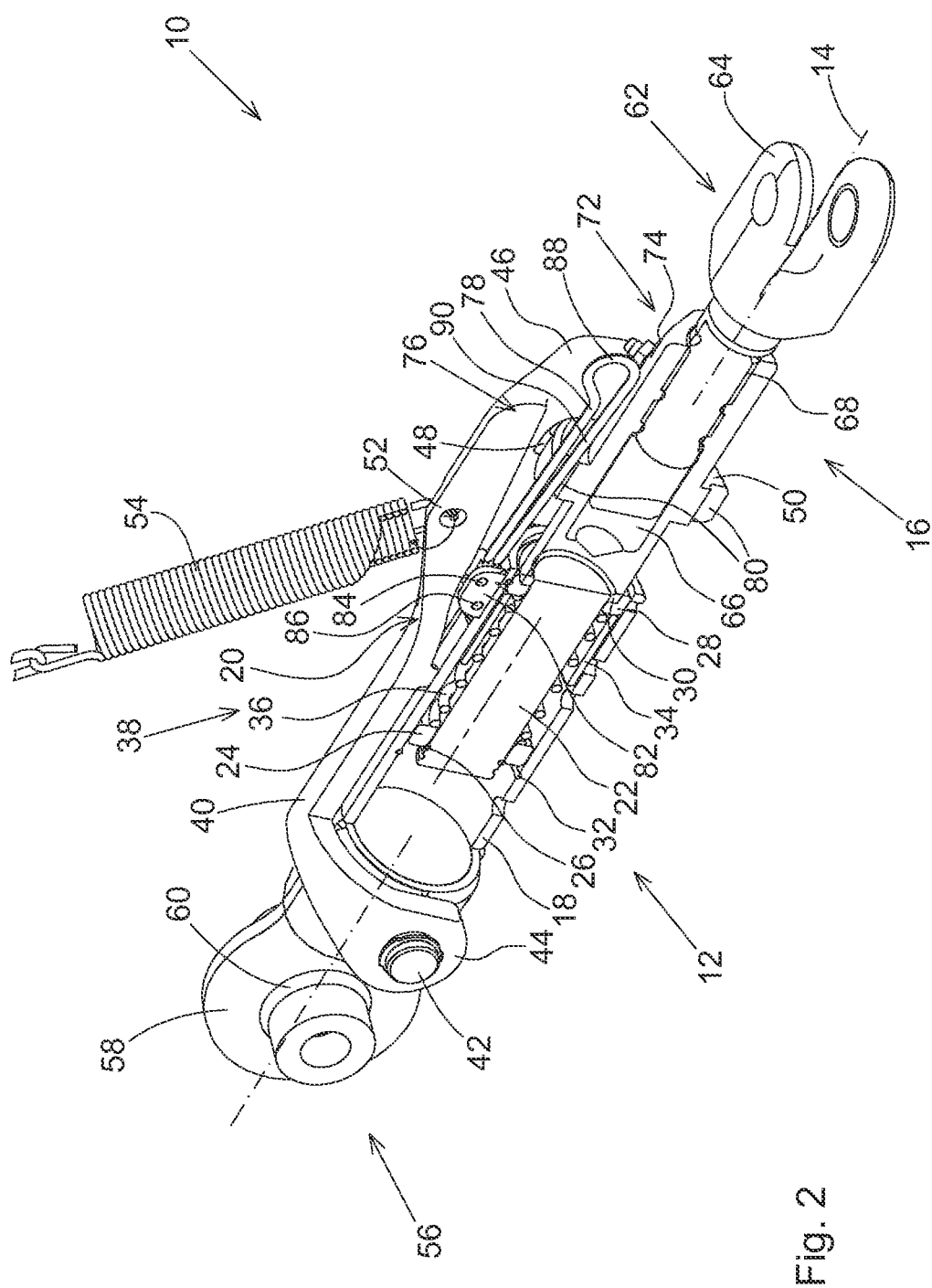
FIG. 2 is a sectioned view of the embodiment of the stabilizer according to the invention set out in FIG. 1.

FIG. 1 is a perspective view of an embodiment of the stabilizer according to the invention for a lower link of a three-point hitch of a tractor, reference being made to the sectioned illustration according to FIG. 2 with regard to structural details.

The stabilizer 10 comprises a first stabilizer member 12 and a second stabilizer member 16 which is resiliently supported with respect to the first stabilizer member 12 along a common longitudinal axis 14, the two stabilizer members 12 and 16 being able to be rotated with respect to the common longitudinal axis 14 in order to adjust the total length of the stabilizer 10. The first stabilizer member 12 is a substantially cylindrical stabilizer housing 18, inside which the second stabilizer member 16 which is constructed as a resilient piston 20 is guided so as to be longitudinally movable.

The resilient piston 20 has a piston portion 22 having a reduced diameter, to which a first stop ring 24 is fitted in a sliding manner in a first end region. The first stop ring 24 is secured by means of a resilient ring 26 which engages in a groove formed at the periphery on the piston portion 22. Furthermore, a second stop ring 28 is fitted in a sliding manner in a second end region. The second stop ring 28 is supported on a collar 30 formed on the resilient piston 20. A spring ring 32 introduced into the stabilizer housing 18 and a spacing member 34 serve to limit a deflection and rebound movement which occurs on the resilient piston 20. A helical spring 36 which surrounds the piston portion 22 extends between the two stop rings 24 and 28. The helical spring 36 is compressed or pretensioned by means of the two stop rings 24 and 28 in such a manner that the resilient piston 20 is urged into a predetermined rest position shown in FIG. 2. In this manner, self-centering of a lower link which is provided with the stabilizer 10 is possible.

It should be noted that the illustration of the first stabilizer member 12 as a substantially cylindrical stabilizer housing 18 has a purely exemplary nature. Instead, a large number of other housing forms are also conceivable.

Furthermore, there is provided a locking means 38 which is connected to the first stabilizer member 12 and which can be moved into a predetermined locking position shown in FIG. 1 in order to limit a resilient movement which occurs between the two stabilizer members 12 and 16. The locking means 38 is constructed as a locking flap 40, the locking flap 40 being pivotably connected to the first stabilizer member 12 by means of a hinge pin 42 which extends transversely relative to the common longitudinal axis 14.

The locking flap 40 which is produced as a cast or forged component is in the form of a half-shell which at least partially surrounds or encloses the first stabilizer member 12. The half-shell terminates at one end in two opposing hinge flaps 44 in which there are formed mutually aligned holes for receiving the hinge pin 42 and consequently in order to produce the pivotable connection to the first stabilizer member 12. At the other end, there are provided two opposing walls 46, each of which has a separate fork-like recess 48 for engagement of a locking collar 50 which is associated with the second stabilizer member 16, the two walls 46 being formed at the inner side thereof in such a manner that they at least partially abut the second stabilizer member 16 in the region of the locking collar 50. By way of example, the locking collar 50 is an integral component of the second stabilizer member 16 and is in the form of an indentation which extends along the outer side of the second stabilizer member 16 in an annular manner.

As can best be seen in FIG. 1, the locking collar 50 which is constructed in a rotationally symmetrical manner with respect to the common longitudinal axis 14 engages in the recesses 48 formed in the locking flap 40 in such a manner that a deflection and rebound movement which occurs between the two stabilizer members 12 and 16 is prevented.

Figure 3:
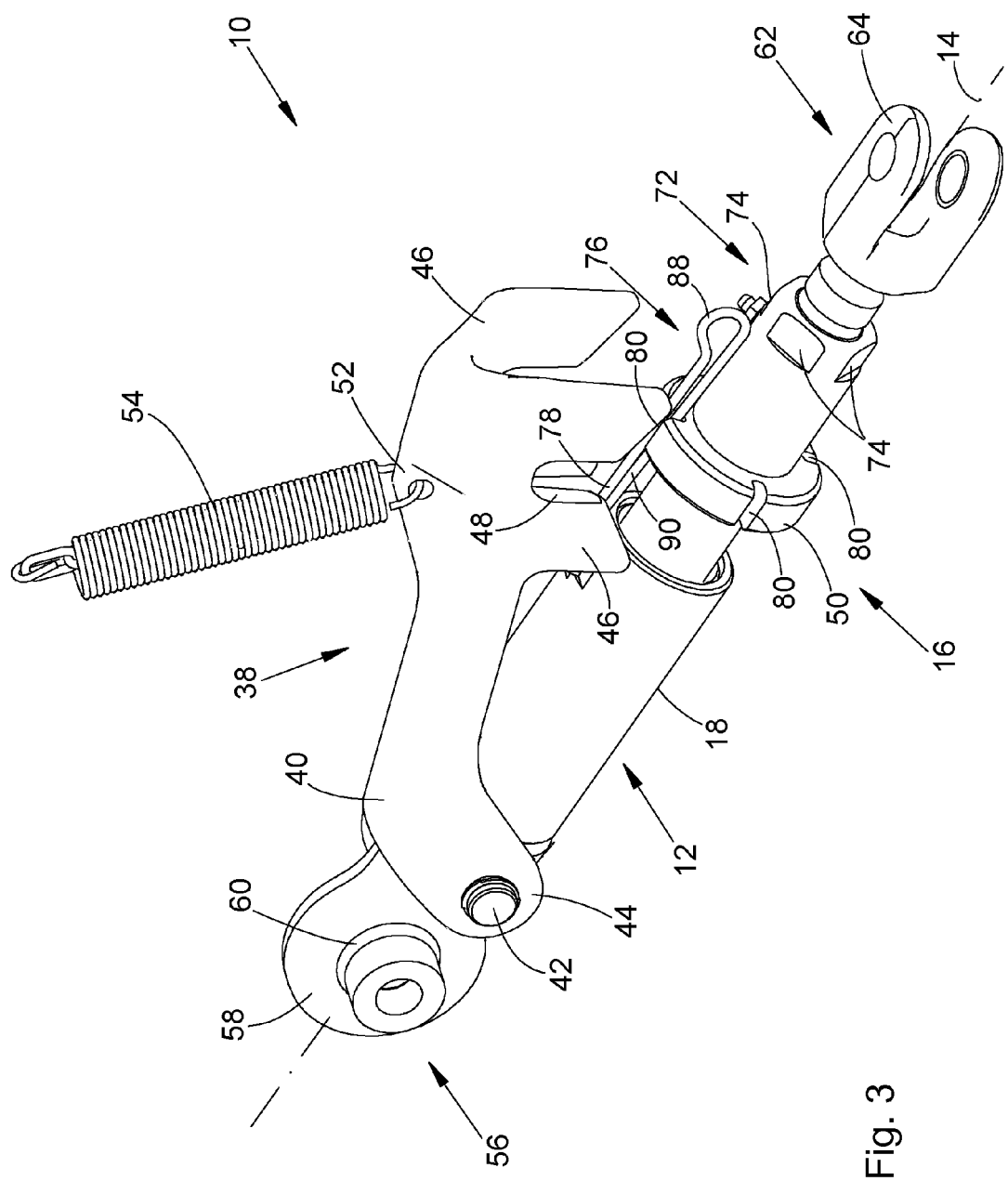
FIG. 3 is another perspective view of the embodiment of the stabilizer according to the invention set out in FIG. 1.

A pulling flap 52 which is arranged on the locking flap 40 allows the locking flap 40 to pivot out of the predetermined locking position as indicated in FIG. 3 and consequently enables release of a deflection and rebound movement which occurs between the two stabilizer members 12 and 16. To this end, the pulling flap 52 can be connected by means of a helical spring 54 to an appropriate securing location on the tractor.

In order to produce a tractor-side articulated connection, the first stabilizer member 12 comprises a spherical lug 56. The spherical lug 56 comprises a securing eyelet 58 which is formed in a securing region of the first stabilizer member 12 and a securing ball 60 which is rotatably supported therein and which enables a spatial movement of the stabilizer 10 with respect to the tractor.

Furthermore, the second stabilizer member 16 comprises a securing member 62 for producing an articulated connection to a lower link of a three-point hitch. The securing member 62 has a securing fork 64 which can be fitted to the lower link, the articulated connection which can be produced with respect to the lower link by means of the securing fork 64 being articulated in such a perpendicular manner with respect to the tractor-side articulated connection in the assembled state that the stabilizer 10 can follow both horizontal and vertical redirections of the lower link.

By way of example, an inner thread 66 which is formed inside the second stabilizer member 16 engages on an outer thread 68 formed on the securing member 62 in such a manner that the stabilizer 10 can be adjusted in terms of its total length by rotating the second stabilizer member 16 with respect to the first stabilizer member 12. A lubrication nipple 70 provided on the second stabilizer member 16 in this instance allows the thread turns to be lubricated with bearing grease.

In order to rotatably actuate the second stabilizer member 16, a tool receiving member 72 is provided. The tool receiving member 72 has a pair of flattened portions 74 which are provided for receiving a combination wrench. In a modification, a large number of additional such flattened portions 74 may also be provided so that, by inverting the combination wrench even under limited spatial conditions, the second stabilizer member 16 can be readily rotatably actuated.

The locking collar 50 and the tool receiving member 72 are an integral component of the second stabilizer member 16. The second stabilizer member 16 is—like the first stabilizer member 12—a cast or forged component produced from a suitable steel alloy.

In order to prevent unintentional adjustment of the total length of the stabilizer 10, the second stabilizer member 16 can be secured with respect to the first stabilizer member 12 by a securing means 76.

The securing means 76 comprises a curved resilient member 78, which engages or is pressed into a recess 80 which is provided in the periphery of the locking collar 50. The curved resilient member 78 can be pivoted manually out of the recess 80 counter to a restoring resilient force so that the locking collar 50 is released. A securing flap 82 which is arranged on the first stabilizer member 12 serves to retain the curved resilient member 78. The securing flap 82 has two transverse holes 84 and 86 which are spaced apart in the direction of the common longitudinal axis 14, each of the two transverse holes 84 and 86 receiving an open end of the curved resilient member 78.

In order to facilitate manual actuation of the curved resilient member 78, it has at a free end thereof a gripping region 88 which widens in the manner of an eyelet. The restoring resilient force is of such a magnitude that, on the one hand, reliable securing of the locking collar 50 is ensured and, on the other hand, it remains possible to actuate the curved resilient member 78 without tools. The curved resilient member 78 is produced from round wire which is rust-resistant or which has been surface-treated in an appropriate manner.

The recess 80 is in the form of a slot-like recess, which is orientated in the direction of a resilient movement which occurs between the first stabilizer member 12 and the second stabilizer member 16. The slot-like recess is constructed in such a manner that it completely receives a securing segment 90 which is provided on the curved resilient member 78. Since the curved resilient member 78 is capable of sliding along the slot-like recess, a resilient movement which occurs between the two stabilizer members 12 and 16 is not impeded.

In this instance, a large number of recesses 80 are arranged along the periphery of the locking collar 50 in a state distributed in a uniform manner so that the total length of the stabilizer 10 can be adjusted and secured in a stepped manner.

The invention claimed is:

1. A stabilizer for a lower link of a three-point hitch of a tractor, the stabilizer comprising:
   a first stabilizer member;
   a second stabilizer member resiliently supported with respect to the first stabilizer member along a common longitudinal axis, wherein the first stabilizer member is rotatable relative to the second stabilizer member for adjusting a total length of the stabilizer;
   a locking device coupled to the first stabilizer member and movable into a predetermined locking position for limiting a resilient movement between the first stabilizer member and the second stabilizer member;
   a locking collar coupled to the second stabilizer member and comprising a rotationally symmetrical housing with respect to the common longitudinal axis, wherein the locking collar is configured to engage a first recess of the locking device for preventing a deflection movement or a rebound movement between the first stabilizer member and the second stabilizer member; and
   a securing device for securing the second stabilizer member to the first stabilizer member, wherein the securing device comprises a curved resilient member configured to engage a second recess positioned in a periphery of the locking collar.

2. The stabilizer of claim 1, wherein the locking device comprises a locking flap pivotably coupled to the first stabilizer member via a hinge pin positioned transversely relative to the common longitudinal axis of the stabilizer.

3. The stabilizer of claim 2, wherein the locking flap at least partially surrounds the first stabilizer member when in the predetermined locking position.

4. The stabilizer of claim 3, wherein the first stabilizer member comprises a spherical lug for producing a tractor-side articulated connection.

5. The stabilizer of claim 4, wherein the second stabilizer member comprises a securing member for producing an articulated connection with respect to the lower link of the three-point hitch.

6. The stabilizer of claim 5, wherein the second stabilizer member comprises an inner thread configured to engage an outer thread formed on the securing member for adjusting the total length of the stabilizer by rotating the second stabilizer member with respect to the first stabilizer member.

7. The stabilizer of claim 6, wherein the second stabilizer member comprises a tool-receiving member for rotating the second stabilizer member.

8. The stabilizer of claim 7, wherein the curved resilient member comprises a gripping region at a longitudinal end, the gripping region configured to be manipulated for moving the curved resilient member into the second recess and out of the second recess.

9. The stabilizer of claim 8, wherein the second recess comprises a slot shape orientated in a direction of the resilient movement between the first stabilizer member and the second stabilizer member.

10. A stabilizer for a lower link of a three-point hitch of a tractor, the stabilizer comprising:
    a first stabilizer member;
    a second stabilizer member coupled to the first stabilizer member by a spring mechanism configured to allow a longitudinal movement between the first stabilizer member and the second stabilizer member, wherein the first stabilizer member is rotatable with respect to the second stabilizer member for adjusting a total length of the stabilizer;
    a locking device coupled to the first stabilizer member and movable from an open position to a closed position for preventing the longitudinal movement between the first stabilizer member and the second stabilizer member;
    a locking collar coupled to the second stabilizer member and configured to be positioned within a recessed portion of the locking device when the locking device is in the closed position for preventing the longitudinal movement between the between the first stabilizer member and the second stabilizer member; and
    a safety device for preventing a rotation between the first stabilizer member and the second stabilizer member, the safety device comprising a spring clip configured to engage a recess formed in a circumference of the locking collar.

11. The stabilizer of claim 10, wherein the locking device comprises a locking flap pivotably coupled to the first stabilizer member via a hinge pin positioned transversely relative to a longitudinal axis of the stabilizer.

12. The stabilizer of claim 11, wherein the locking flap at least partially surrounds the first stabilizer member when in the closed position.

13. The stabilizer of claim 12, wherein the first stabilizer member comprises a spherical lug for coupling with the tractor.

14. The stabilizer of claim 13, wherein the second stabilizer member comprises a securing member for coupling with the lower link of the three-point hitch.

15. The stabilizer of claim 14, wherein the second stabilizer member comprises an inner thread configured to engage an outer thread formed on the securing member for adjusting the total length of the stabilizer by rotating the second stabilizer member with respect to the first stabilizer member.

16. The stabilizer of claim 15, wherein the second stabilizer member comprises a tool-receiving member for rotating the second stabilizer member.

17. The stabilizer of claim 16, wherein the spring clip comprises a gripping region at a longitudinal end, the gripping region configured to be manipulated for moving the spring clip into the recess and out of the recess.

18. The stabilizer of claim 17, wherein the recess comprises a slot shape orientated in a direction along the longitudinal axis of the stabilizer.

\* \* \* \* \*